United States Patent
Raghunath

(10) Patent No.: US 8,001,086 B2
(45) Date of Patent: *Aug. 16, 2011

(54) SHARING FILES AMONG DIFFERENT VIRTUAL MACHINE IMAGES

(75) Inventor: Mandayam Thonadur Raghunath, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 239 days.

This patent is subject to a terminal disclaimer.

(21) Appl. No.: 12/330,090

(22) Filed: Dec. 8, 2008

(65) Prior Publication Data

US 2009/0150879 A1    Jun. 11, 2009

Related U.S. Application Data

(63) Continuation of application No. 11/328,318, filed on Jan. 9, 2006, now Pat. No. 7,496,613.

(51) Int. Cl.
*G06F 17/30* (2006.01)
(52) U.S. Cl. ......... 707/654; 707/752; 707/753; 707/754
(58) Field of Classification Search .................. None
See application file for complete search history.

(56) References Cited

U.S. PATENT DOCUMENTS

2004/0034849 A1*  2/2004  Cohen et al. .................. 717/120

FOREIGN PATENT DOCUMENTS

GB       WO01/57649 A3    8/2001

* cited by examiner

*Primary Examiner* — Baoquoc To
(74) *Attorney, Agent, or Firm* — Michael J. Buchenhorner; Vazken Alexanian

(57) ABSTRACT

A system for sharing files among different virtual machine images includes a processor, a memory, and an input/output subsystem. The processor is configured for: a) creating a first virtual image; b) determining whether there exists a second virtual image similar to the first virtual image; c) comparing the files of the first and second virtual images to determine a set of common files; d) creating a common file collection; f) creating a second version of the first virtual image with files in the first virtual image that are not in the common file collection; g) creating a second version of the second virtual image with files in the second virtual image that are not in the common file collection; h) receiving a request for modification of the file within one of the virtual images; and i) determining whether the file to be modified is in the set of common files.

5 Claims, 5 Drawing Sheets

SHARING FILES AMONG DIFFERENT VIRTUAL MACHINE IMAGES

CROSS-REFERENCE TO RELATED APPLICATIONS

This application is a continuation of, and claims priority from, commonly-owned, co-pending U.S. application Ser. No. 11/328,318, filed on Jan. 9, 2006.

STATEMENT REGARDING FEDERALLY SPONSORED-RESEARCH OR DEVELOPMENT

None.

INCORPORATION BY REFERENCE OF MATERIAL SUBMITTED ON A COMPACT DISC

None.

FIELD OF THE INVENTION

The invention disclosed broadly relates to the field of information processing systems, and more particularly relates to the field of virtual machine images.

BACKGROUND OF THE INVENTION

Virtual machine (VM) software currently enables users to run multiple operating systems on a single physical machine by supporting VM bundles that encapsulate an entire hard disk as well as the state of the system RAM (random-access memory). Users often need to run the multiple VMs based on the same operating system. For example, one may want to run two Microsoft XP operating system images and two Linux operating system images in the same computer. It is wasteful to replicate the same OS system files in all of the XP images or in all of the Linux images. Consider, for example, an upgrade patch to be downloaded for upgrading an application program or the operating system. When multiple images exist, all must be modified to keep them in synchronization. Therefore, there is a need for a method and system that overcomes the above wasteful replication.

SUMMARY OF THE INVENTION

Briefly, according to an embodiment of the invention, an information processing system includes a processor; a memory; and an input/output subsystem. The processor is configured for: a) creating a first virtual image comprising one or more files; b) determining whether there exists a second virtual image that is identical to the first virtual image; c) comparing the one or more files of the first virtual image with the one or more files of the second virtual image to determine a set of common files; d) creating a common file collection comprising the set of common files; f) creating a second version of the first virtual image comprising only files in the first virtual image that are not in the common file collection; and g) creating a second version of the second virtual image comprising only files in the second virtual image that are not in the common file collection.

BRIEF DESCRIPTION OF THE DRAWINGS

To describe the foregoing and other exemplary purposes, aspects, and advantages, we use the following detailed description of an exemplary embodiment of the invention with reference to the drawings, in which.

Figure 1:
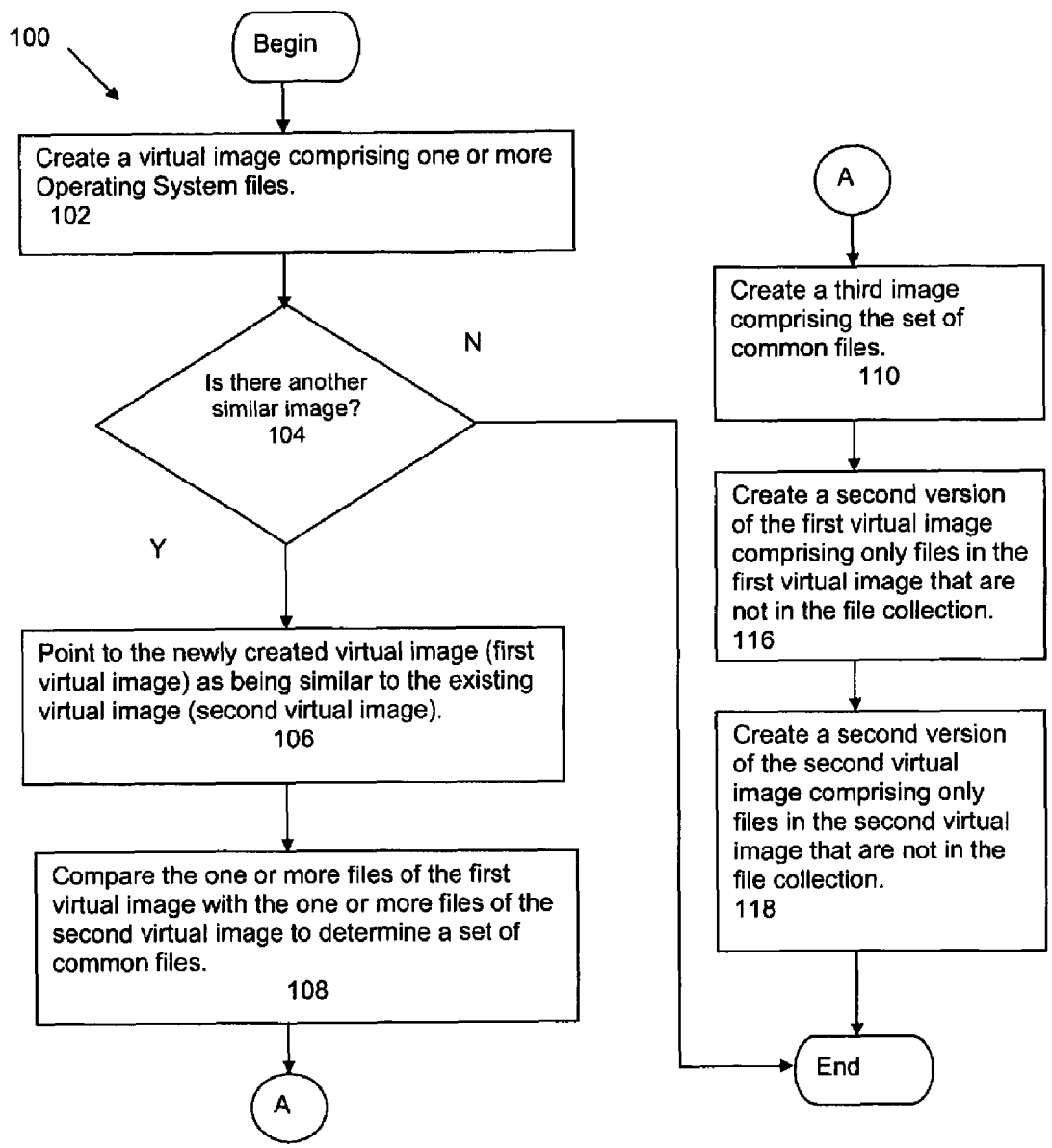
FIG. 1 is a flowchart of a method of creating VM images according to an embodiment of the invention.

While the invention as claimed can be modified into alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the scope of the present invention.

DETAILED DESCRIPTION

Referring to FIG. 1, there is shown a flowchart of a method 100 according to an embodiment of the invention. Step 102 creates a first virtual image comprising one or more Operating System files. Step 104 determines whether a similar virtual image exists. If no similar image exists, the method 100 ends.

If there is an existing (second) virtual image, then in step 106 we point to the newly-created virtual image (first virtual image) as being similar to the existing virtual image (second virtual image). In step 108, we compare the one or more files of the first virtual image with the one or more files of the second virtual image to determine a set of common files. In step 110 we create a third image comprising a set of common files. In step 116 we create a second version of the first virtual image comprising only files in the first virtual image that are not in the file collection. In step 118 we create a second version of the second virtual image comprising only files in the second virtual image that are not in the file collection.

In the following description, numerous specific details are set forth by way of exemplary embodiments in order to provide a more thorough description of the present invention. It will be apparent, however, to one skilled in the art, that the present invention may be practiced without these specific details. In other instances, well-known features have not been described in detail so as not to obscure the invention. The preferred embodiments of the inventions are described herein in the Detailed Description, Figures and Claims. Unless specifically noted, it is intended that the words and phrases in the specification and claims be given the ordinary and accustomed meaning as understood by those of skill in the applicable art. If any other meaning is intended, the specification will specifically state that a special meaning is being applied to a word or phrase.

Figure 2:
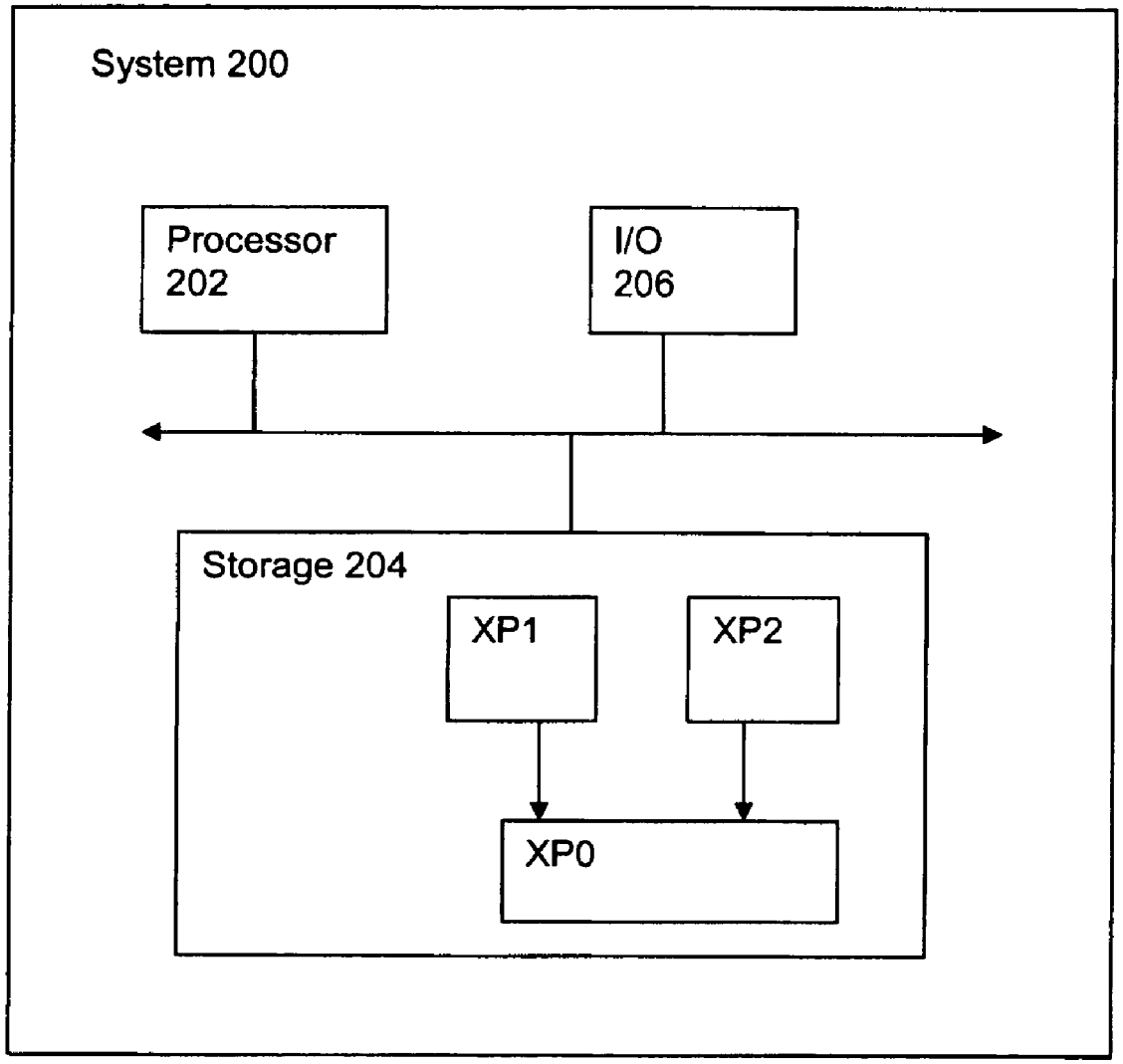
FIG. 2 is a high level block diagram showing an information processing system storing OS images according to another embodiment of the invention.

Referring to FIG. 2, there is shown a high level block diagram showing an information processing system 200 according to another embodiment of the invention. The system 200 comprises a processor (e.g., one or more microprocessors) 202, an input/output subsystem 206 (e.g., including a user interface and a network interface for communicating with other machines within one or more networks). The system 200 also comprises non volatile storage (e.g., hard disk)

204. According to this embodiment of the invention, the storage 204 comprises virtual images XP0, XP1, and XP2. Each of these has Microsoft XP as its core operating system.

When the user creates a new virtual image, he gives it a name and has an idea of what he is going to install on the virtual image. At this time he identifies a similar virtual image, if he already has one. For instance, when he creates the second XP image (XP2) he points it to the first (XP1) as being similar. After that he installs a brand new XP image into XP2, then he runs a diff program that compares all of the files that are in XP1 with the corresponding files that are in XP2 and creates three images: (1) XP0 which has the common files; (2) XP1 which has only the files in XP1 that are not in XP0, and (3) XP2 that has only the files that are in XP2 and not in XP0.

During runtime, files may be modified in either XP1 or XP2. If the modified file actually turns out to be in XP0, it is removed from XP0 and moved into the appropriate XP1 or XP2 virtual image. At any time one may re-run the diff program to move common files to XP0. If two files are different even by one bit, they do not belong in XP0.

By running the diff program periodically one can easily capture identical changes to the two images. One place where an operation is likely to result in identical changes being applied to multiple virtual images is when security patches are applied to the virtual images. One can apply the patch to XP1 and then to XP2 and then rerun the diff program to synchronize the images again.

Alternatively, if a user can download the security patch and apply it while the virtual images are suspended, then the user can directly apply the patch to XP0 and any files in XP1 and XP2, instead of applying the patches one at a time. One may also lock down the core OS part of XP0 (e.g., directories and/or files) and prevent the creation of differences at run time. So users are prevented from modifying any of the core OS files or adding/deleting files in critical directories. Patches may be applied by the central administrator and replicated to all machines, if this mode of operation is supported, it may be advantageous to create XP0 even if we only have one XP1 on a machine. The foregoing sharing technique is specially important for the case where XP1 and XP2 are carried on portable media as described in U.S. patent application Ser. No. 10/795,153 where storage may be more limited than in non-portable computing apparatuses.

Figure 3:
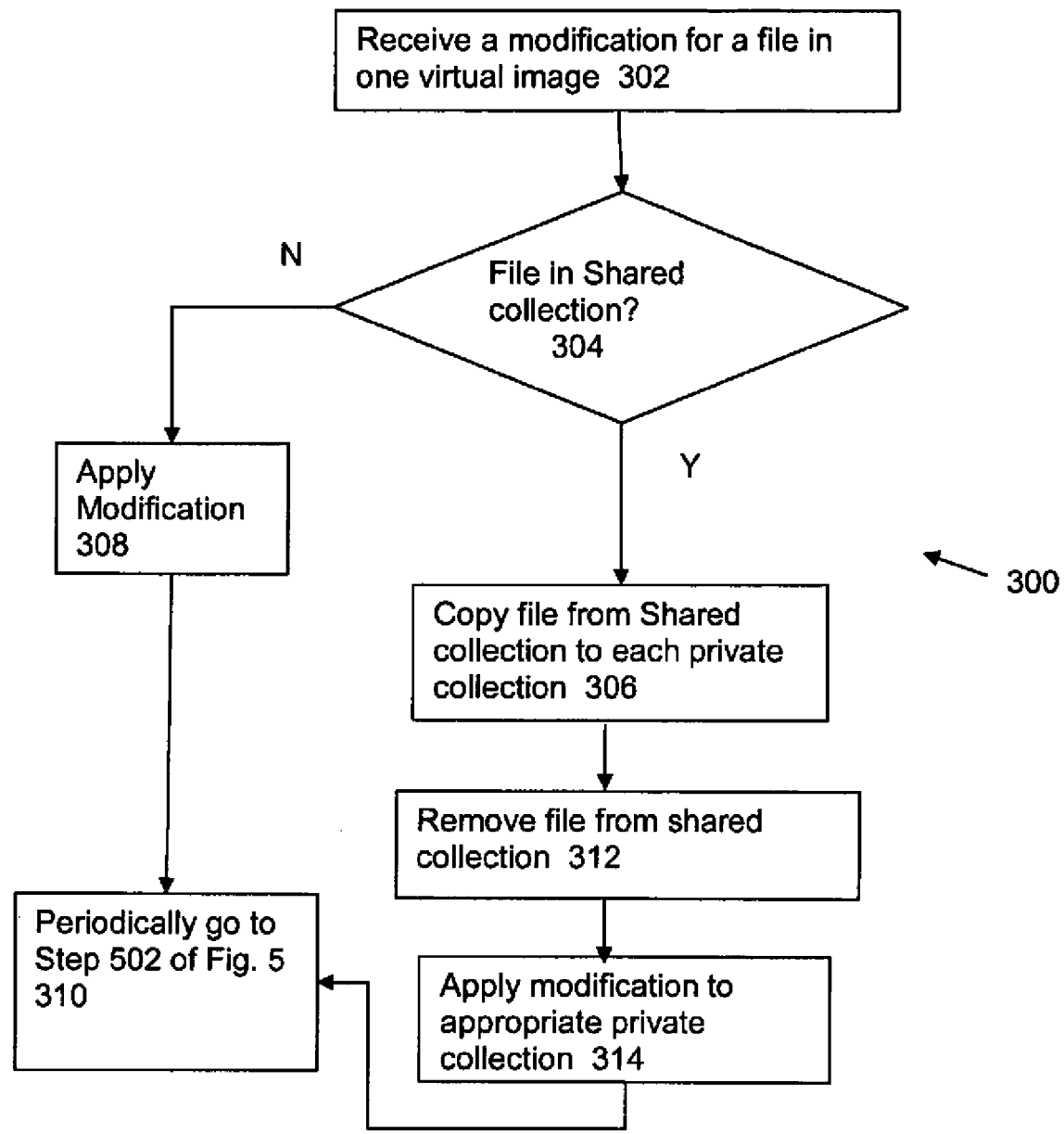
FIG. 3 is a flowchart of a method for applying modification to files according to another embodiment of the invention.

Referring to FIG. 3, there is shown a flowchart of a method 300 according to another embodiment of the invention. In step 302 we receive a modification for a file in a virtual image. The modification may take the form of a patch for an application program hosted by the system 200. In step 304 the system 200 makes a determination of whether the patch applies to a file in the shared collection XP0 or in one of the private collections XP1 or XP2. If the same application version is installed in both virtual machines, the file would most likely be in the shared collection since the same (identical) file is used in both virtual machines. If the determination 304 is that a copy of the file exists in the shared collection, then in step 306 the file is copied from that collection and placed in each private collection. In step 312 the file is removed from the shared collection and in step 314 the file is applied to the appropriate private collection. If the determination 304 is negative, the method 300 proceeds to step 308 where the received modification is applied to the target file. In step 310, the method 300 periodically performs step 502 of method 500.

Figure 4:
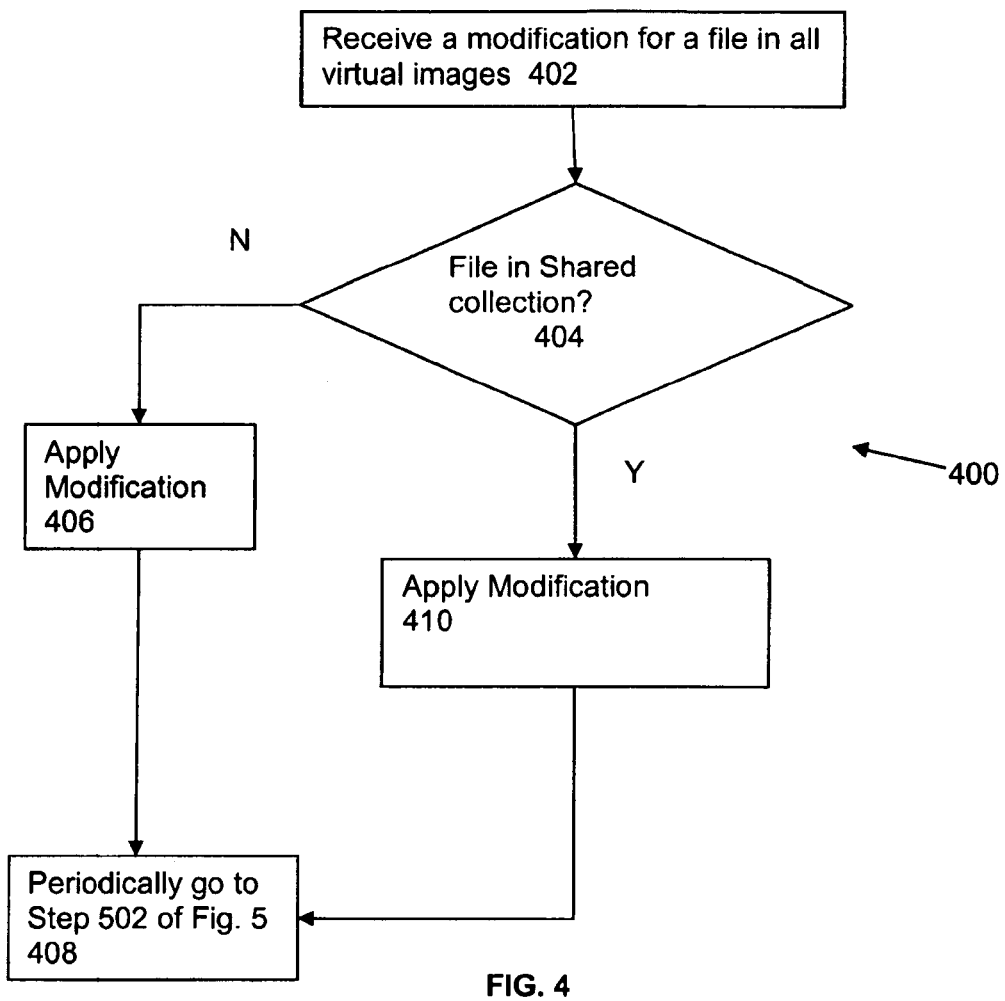
FIG. 4 is a flowchart of a method for applying a modification to a file in all virtual images.

Referring to FIG. 4, there is shown a flowchart of a method 400 according to another embodiment of the invention. A modification is received in step 402. This modification is for a file in all virtual images. In this method 400 the received modification is applied (steps 406 or 410) regardless of whether step 404 determines the existence of the filed to be modified in the shared collection. If the file is in the private collections, the modification is applied to the copies in the private collections.

Figure 5:
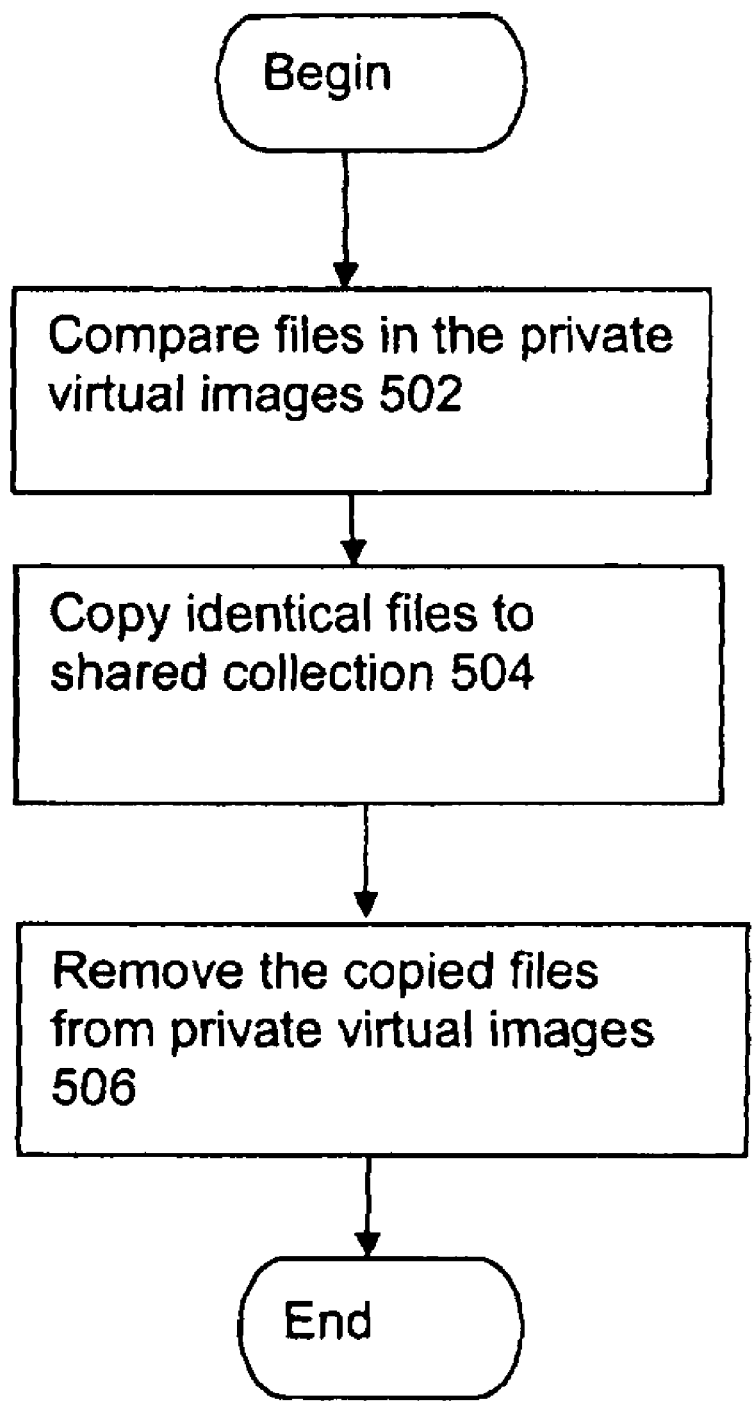
FIG. 5 is a flowchart of another method for applying modifications to files according to another embodiment of the invention.

Referring to FIG. 5, there is shown a flowchart of method 500 according to another embodiment of the invention. This method 500 is applied to resynchronize changes to files applied separately. In step 502 the files in the virtual images XP1 and XP2 are compared with each other. In step 504, all files that are identical copied from XP1 or XP2 into the shared collection XP0. In step 506, the files are deleted from XP1 and XP2. Then the method ends at this point.

Therefore, while there has been described what is presently considered to be the preferred embodiment, it will understood by those skilled in the art that other modifications can be made within the spirit of the invention. The above description of an embodiment is not intended to be exhaustive or limiting in scope. The embodiment, as described, was chosen in order to explain the principles of the invention, show its practical application, and enable those with ordinary skill in the art to understand how to make and use the invention. It should be understood that the invention is not limited to the embodiment described above, but rather should be interpreted within the full meaning and scope of the appended claims.

We claim:

1. An information processing system comprising:
    a processor;
    a memory; and
    an input/output subsystem, wherein the processor is configured for:
    a) creating a first virtual image comprising one or more operating system files;
    b) determining whether there exists a second virtual image that is similar to the first virtual image, wherein the second image comprises one or more operating system files;
    c) comparing the one or more operating system files of the first virtual image with the one or more operating system files of the second virtual image to determine a set of common files;
    d) creating a common file collection comprising the set of common operating system files;
    e) creating a second version of the first virtual image comprising only files in the first virtual image that are not in the common file collection;
    f) creating a second version of the second virtual image comprising only operating system files in the second virtual image that are not in the common operating system file collection;
    g) receiving, during runtime, a request for modification of the operating system file within one or both of the first virtual image and the second virtual image, wherein the request comprises said modification and said modification comprises a security patch;
        wherein receiving said request for modification of the file calls for the modification to be applied to all images and the method further comprises suspending the first and second virtual images, and applying the security patch to the first and second virtual images while the first and second virtual images are suspended, and wherein the patch is directly applied to the common operating system file collection without migrating the operating system files into private collections;
    h) determining whether the operating system file is in the common operating system file collection;

i) removing the operating system file from the common operating system file collection if the operating system file is in the common operating system file collection;

j) copying the operating system file into both the first and second virtual images; and k) applying the modification to the operating system file in the requested one or both of the first and second virtual images.

2. The system of claim 1, wherein the processor is further configured for:

periodically comparing the one or more operating system files of the first virtual image with the one or more operating system files of the second virtual image to determine a set of common operating system files.

3. The system of claim 1, wherein the common operating system file collection comprises a core operating system part and the processor is further configured for locking the core operating system part and preventing modification, addition, and deletion of any core operating system files in specified directories.

4. The system of claim 1, further comprising an input comprising the patch from a system administrator and wherein the processor is further configured for receiving the patch to be applied to all virtual machines.

5. The system of claim 1, wherein the processor is further configured for creating a second virtual image, comprising one or more files, wherein the second virtual image is initially empty, if it is determined that there does not exist a second virtual image that is identical to the first virtual image.

* * * * *